(12) United States Patent
Osborn et al.

(10) Patent No.: US 6,533,090 B2
(45) Date of Patent: Mar. 18, 2003

(54) INTEGRATED AXLE MODULE WITH TWIN ELECTRONIC TORQUE MANAGEMENT

(75) Inventors: Russell Percy Osborn, Rochester Hills, MI (US); Theodor Gassmann, Siegburg (DE)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/922,080

(22) Filed: Aug. 3, 2001

(65) Prior Publication Data

US 2003/0024787 A1 Feb. 6, 2003

(51) Int. Cl.[7] ............ F16D 27/12; B60K 17/02
(52) U.S. Cl. ............ 192/48.2; 192/49; 192/84.6; 192/84.7; 464/175
(58) Field of Search ............ 192/35, 48.2, 49, 192/70.23, 70.24, 84.6, 84.7, 84.91, 93 A; 74/650, 18; 464/175; 180/247, 248

(56) References Cited

U.S. PATENT DOCUMENTS

| 5,080,640 A | * | 1/1992 | Botterill | 475/150 |
|---|---|---|---|---|
| 5,106,349 A | * | 4/1992 | Botterill et al. | 192/93 A |
| 5,690,002 A | * | 11/1997 | Showalter | 192/35 |
| 5,699,888 A | * | 12/1997 | Showalter | 192/35 |
| 5,845,546 A | * | 12/1998 | Knowles et al. | 74/650 |
| 5,884,738 A | * | 3/1999 | Joslin et al. | 192/35 |
| 5,984,039 A | * | 11/1999 | Mayr | 180/248 |
| 6,098,770 A | * | 8/2000 | Isley, Jr. | 192/35 |
| 6,378,677 B1 | * | 4/2002 | Kuroda et al. | 192/35 |
| 6,398,686 B1 | * | 6/2002 | Irwin | 192/84.6 |

FOREIGN PATENT DOCUMENTS

EP 0 394 683 A1 * 10/1990

* cited by examiner

Primary Examiner—Rodney H. Bonck
(74) Attorney, Agent, or Firm—Mick A. Nylander

(57) ABSTRACT

An axle module for use in an automotive vehicle. The axle module includes a housing and a shaft rotatably supported within that housing. The axle module also includes a ring gear connected to the shaft. The axle module also includes a clutch pack housing engaged with an end of shaft while a side shaft joint is arranged within the clutch pack housing. The side shaft joint is connected to a side shaft which is further connected to a wheel of the automotive vehicle. A plurality of plates extend from the clutch pack housing and from the side shaft joint such that they overlap in an alternating manner with one another. The axle module also includes a motor which is used to control the transfer of an axial torque through the clutch pack housing and plurality of plates.

20 Claims, 5 Drawing Sheets

INTEGRATED AXLE MODULE WITH TWIN ELECTRONIC TORQUE MANAGEMENT

TECHNICAL FIELD

The present invention relates to axles and differential drives for motor vehicles and more particularly, relates to an axle module with twin electronic torque management for use in a vehicle.

BACKGROUND ART

Torque distribution systems in automotive vehicles have been known for many years. Generally speaking, torque distribution devices either control the torque being transferred to an axle as found in an in-line Hang-on all wheel drive system, or may even control the torque being transferred to each individual wheel, as found in a twin "hang-on" all wheel drive system. In the twin "hang-on" all wheel drive systems there is typically a primary driven axle and a secondary driven "hang-on" axle that is connected via a prop shaft or drive shaft and torque transfer couplings to the primary driven axle. The primary driven axle also generally includes a differential which divides the torque to the side shaft of each axle and then the wheels. The division of torque between the primary and secondary axles is completed by the torque transfer couplings which are usually integrated in the secondary axle.

A typical prior art twin Hang-on all wheel drive system provides a permanent drive primary axle. However, when the primary axle starts to slip, i.e., the wheels are on a slick road condition or loose gravel, etc., the prior art systems will apply torque to each wheel of the secondary axle until the appropriate wheel torque is achieved. This provides a traction performance advantage over in-line Hang-on torque distribution systems under slip conditions similar to that of a limited slip differential. It should be noted that the twin torque distribution systems eliminate any need for a differential gear set within the secondary axle.

However, with the increased traction performance of the prior art systems, a substantial number of draw backs are encountered such as complexity of the torque distribution system, the weight of the torque distribution system and the cost to manufacture and design such systems. Furthermore, the prior art torque distribution systems generally have axles that are bulky and difficult to package in the small area left for the drive-line systems. Furthermore, the increased cross vehicle width of most twin axles causes the inboard side shaft joints to be positioned or shifted towards the wheel, thus leading to packaging conflicts with the chassis components and an increase in joint angles which effects the efficiency and durability of constant velocity joints and the like. In the recent past there have been numerous attempts to overcome the above identified problems in the area of conventional drive-line systems. Most of these systems try to develop a method to reduce the mass, packaging requirements and joint angles of conventional axles by integrating the inboard side shaft joints and the differential housing. Some of these proposals have been successful in attempting to provide a lower weight, lower cost or smaller side shaft joint angle needed in current all wheel drive vehicles. However, no such integration with a twin axle including speed sensing or electronically controlled clutch packs, has been provided to date.

Therefore, there is a need in the art for an axle module that includes an integration of joints into a smaller package, reduced weight and lower side shaft joint angle, in combination with a torque distribution system that also still provides the improved traction performance demanded by all wheel drive systems. Furthermore, there is a need in the art for a torque distribution system that can electronically be controlled, thus providing for tuning for each desired vehicle's handling and performance requirements and also creating a preemptive locking system for such all wheel drive systems.

BRIEF SUMMARY OF THE INVENTION

One object of the present invention is to provide an improved torque distribution system.

Another object of the present invention is to provide an integrated axle module that includes twin electronic torque management units.

Yet a further object of the present invention is to reduce the weight and packaging requirements for an axle module in an automotive vehicle.

Still another object of the present invention is to provide an integrated axle module unit that reduces the side shaft joint angle between the module and wheels.

A further object of the present invention is to provide a torque distribution system that electronically controls the tuning for the desired vehicle handling and performance requirements.

Still a further object of the present invention is to provide an axle module that also is capable of twin axle preemptive locking measures.

Still a further object of the present invention is to provide an axle module that reduces packaging and increases integration of parts in a smaller unit.

To achieve the foregoing objects the axle module for use in a vehicle includes a housing wherein a shaft is rotatably supported within the housing. The axle module further includes a ring gear connected to the shaft. The axle module also includes a clutch pack housing engaged with an end of the shaft. A side shaft joint is then arranged within the clutch pack housing. A plurality of plates extend from the clutch pack housing and from the side shaft joint. The axle module further includes a side shaft connected to a side shaft joint.

One advantage of the present invention is a new and improved torque distribution device for a vehicle.

A further advantage of the present invention is that the integrated axle module improves traction while reducing the mass, weight and packaging requirements within the drive train system. A further advantage of the present invention is that the integrated axle module decreases the side shaft joint angle from the axle module to the wheels.

A further advantage of the present invention is that the axle module is capable of independently controlling each wheels' distributed torque via a motor.

A further advantage of the present invention is that the integrated axle module can be tuned for the desired vehicles handling and performance requirements.

Yet a further advantage of the present invention is that the integrated axle module can be used as a preemptive blocking device for each axle and wheel independently of each other wheel.

Still a further advantage of the present invention is the use of the side shaft joint as an inner race of the clutch pack.

Other objects, features, and advantages of the present invention will become apparent from the subsequent description and appended claims taken in conjunction with the accompanying drawings.

BEST MODE OF CARRYING OUT THE INVENTION

Figure 1:
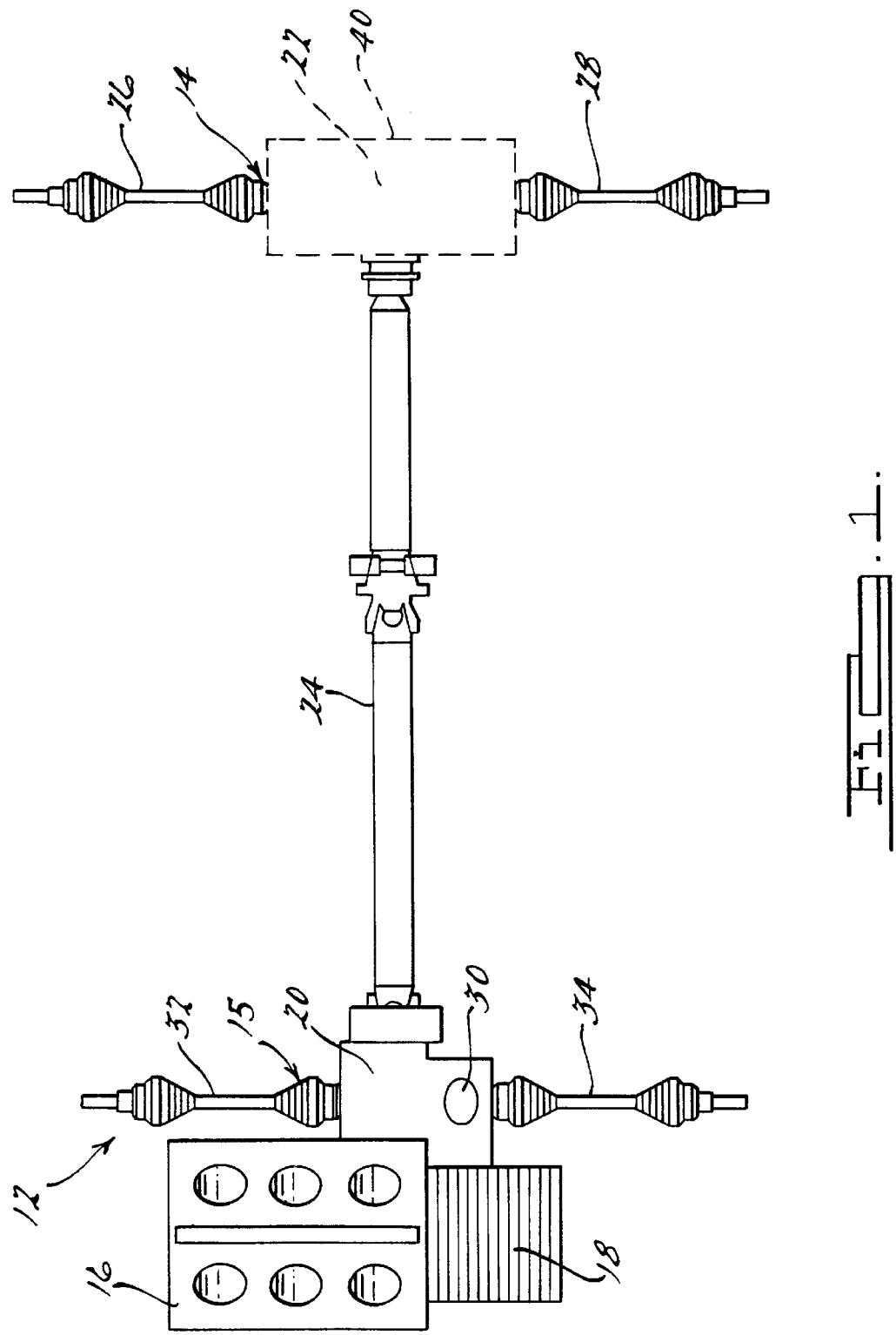
FIG. 1 shows a schematic view of a vehicle system according to the present invention.

Referring to the drawings, an integrated axle module 22 according to the present invention is shown. FIG. 1 schematically illustrates an all wheel drive or a four wheel drive motor vehicle 12 that is a primary front wheel driven vehicle, however, the present invention can also be used on a primary rear wheel drive driven vehicle as well.

A motor vehicle 12 as shown in FIG. 1 is permanently driven by a front axle 15. The motor vehicle 12 is driven by power transferred from the engine 16 through a transaxle or gear box 18 which may be either an automatic or manual gear box. The power from the gear box 18 enters the power takeoff 20 of the drive train assembly and finally on through to the front differential 30. When there is a demand for power the power is transferred to the rear axle module 22 via a propeller shaft or driving shaft 24. At the rear axle module 22 power splits to a left hand rear side shaft 26 then the right hand rear side shaft 28 for distribution to the wheels at the rear of the vehicle. The front differential or front axle module 30 distributes torque between the left hand front side shaft 32 and the right hand front side shaft 34. In an all wheel drive vehicle, power is delivered to both the rear axle module 22 and the front differential 30, the front axle 15 is a primarily driven axle, with the rear axle 14 only receiving the power when needed. The preferred embodiment of the present invention is an all wheel drive vehicle wherein torque is distributed to each wheel of the secondary axle in an independent manner depending on which wheels are in a slip condition or are in a non-slip condition with respect to the road. The integrated axle module 22 of the present invention could also be used in both the front and rear axles of the all wheel drive unit.

The drive train 36 includes the front axle 15 which includes a left hand front side shaft 32 and a right hand front side shaft 34. The propeller shaft and drive shaft 24 transmits the power from the power take off 20 to a rear axle module 22. The rear axle module 22 has a right hand rear side shaft 26 and a left hand rear side shaft 28 extending therefrom to the vehicle wheels which will propel the vehicle in a forward or reverse motion. The integrated axle module 22 includes a housing 40. One end of the prop shaft 24 includes a pinion gear which is integrated within the axle module housing 40 and provides the necessary power needed to spin the side shafts 26, 28 to each wheel.

Figure 2:
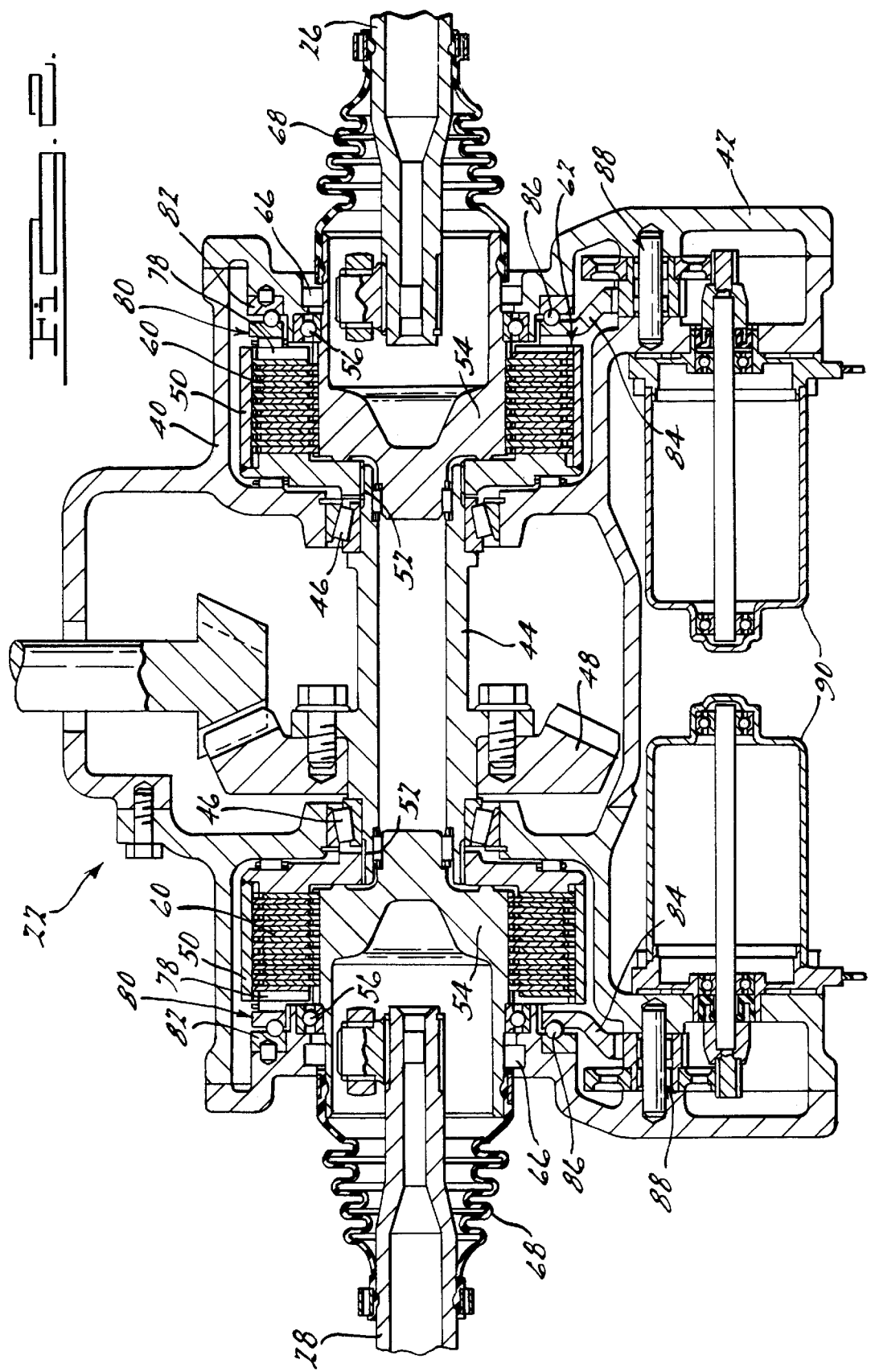
FIG. 2 shows a cross-section of the axle module according to the present invention.
Figure 3:
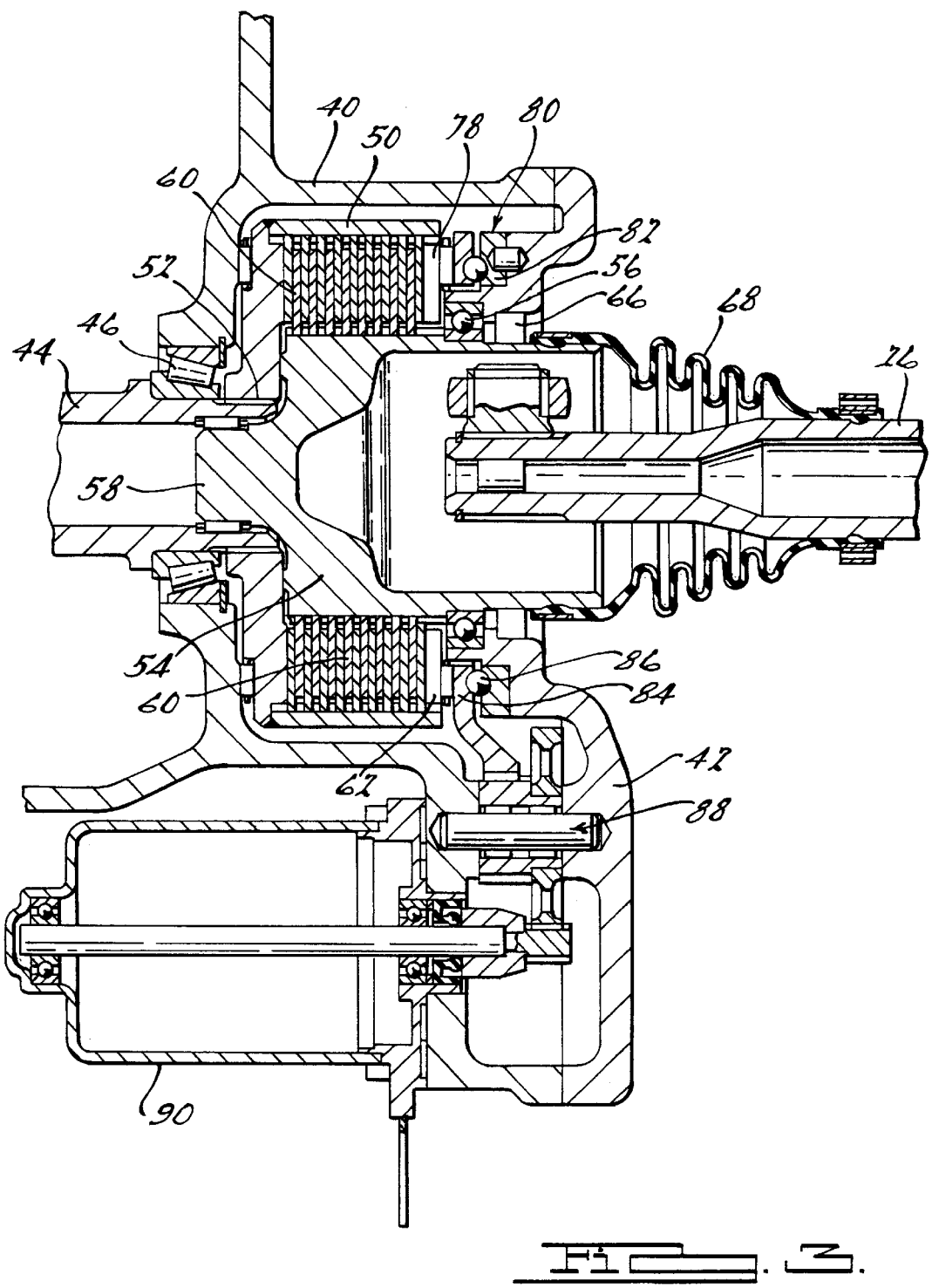
FIG. 3 shows a partial cross section of the axle module according to the present invention.

FIG. 2 shows a cross section of the integrated axle module 22 and FIG. 3 shows a cross section of one half of the integrated axle module 22 according to the present invention. An opposite half extends to the other wheel from the rear or front axle and is the mirror image of that shown in FIG. 3. The axle module 22 includes a housing 40. The housing 40 includes at least one end plate 42 on an end thereof. A shaft 44 is rotatably supported within the housing 40 by a first and second set of bearings 46. The shaft 44 has a ring gear 48 attached by any known securing means to an outside surface thereof. The ring gear 48 is positioned within the housing 40 such that it mates and engages with the pinion gear which is attached to one end of the propeller shaft 24 of the drive train system. When the pinion gear rotates it in turn rotates the ring gear 48 which provides the rotary motion necessary for the rotatably supported shaft 44 within the axle module 22. The pinion gear is located within a generally known extension of the housing 40 and is sealed within the integrated axle module housing 40. The shaft 44 is connected at each end thereof to a first and second clutch pack housing 50. The preferred embodiment of the shaft 44 has a plurality of teeth 52 on each end thereof and these teeth mate with teeth on an inner circumference of an orifice on the first and second clutch pack housing 50. A first and second inboard side shaft joint 54 is arranged within the first and second clutch pack housing 50, respectfully. The inboard side shaft joint 54 is supported within the housing 50 by a first and second set of bearings 56. The inboard side shaft joint 54 generally has a U shaped cross section and includes a circular segment 58 extending from one end thereof. The circular like segment is rotatably supported within the inner walls of each end of the shaft 44.

An inner surface of the clutch pack housing 50 and an outer surface of the inner side shaft joints 54 each include a plurality of friction plates 60 extending therefrom. The inner surface of the clutch pack housing 50 and the outer surface of the inboard side shaft joint 54 form a chamber 62. The friction plates 60 extend into this chamber 62 in an alternating pattern such that a friction plate 60 from the clutch pack housing 50 is directly adjacent to a friction plate from the inboard side shaft joint 54 and so on throughout the entire chamber 62. The inboard side shaft joints 54 are connected to a first and second interconnecting shaft 64 respectively and then on to the side shaft 26, 28 and eventually the wheels on each side of the automotive vehicle.

The housing 40 and the inboard side shaft joints 54 are sealed at the ends of the side shaft joints 54 by a seal 66 located between the housing 40 and an outer member of the inboard side shaft joint 54. The seal 66 used in combination with a rotating boot member 68, will seal the inboard side shaft joints 54 and their inner joint mechanisms while also allowing for articulation of the side shaft 26 to the wheel. This combination of the seal 66 and rotating boot seal 68 allows for one lubricant to be used in lubricating the gears and clutch packs 50 while a separate lubricant is used to lubricate the inner workings of the inner side shaft joints 54. The rotating boot member 68 is connected via any known means to the outer surface of the inboard side shaft joints 54 and then also connected to the outer surface of the side shaft 26, 28 extending from each side of the axle module 10.

Figure 4:
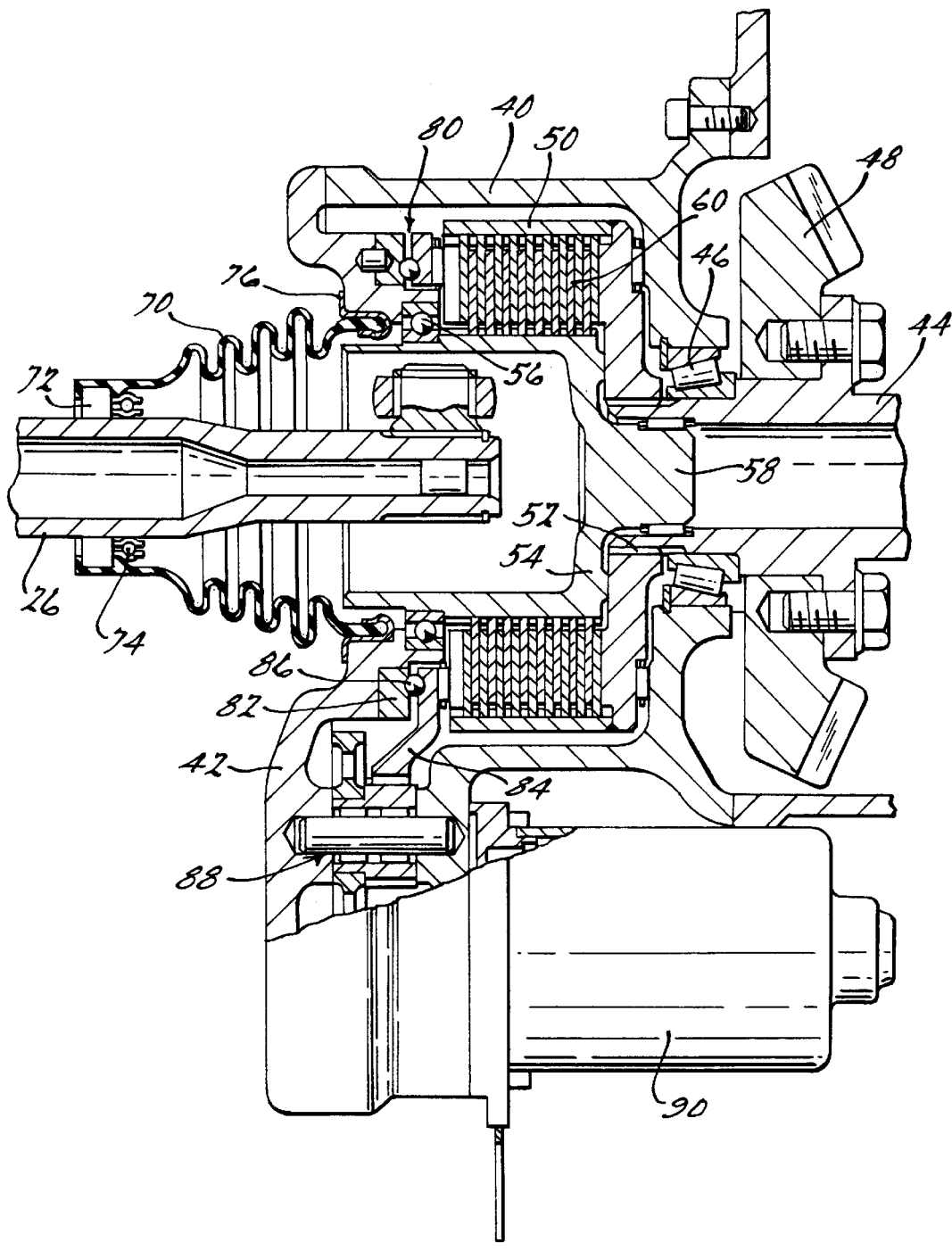
FIG. 4 shows a partial cross section of an alternative embodiment of the axle module according to the present invention.

An alternate embodiment as shown in FIG. 4 shows a stationary boot member 70 being used to seal both the housing 40 and inboard joint members 54 from outside contaminates. The seal boot member 70 is fixed to the housing 40 via any known securing means such as a metallic clip 76 and then is sealed at the side shaft 26, 28 by use of a seal 72 that is piloted by a bearing 74. This allows for the side shaft 26 to rotate within the end of the sealed boot 70 thus keeping the seal boot 70 stationary with relation to the housing 40. This arrangement allows for a single lubricant to be used for both the gears and clutch packs 50 along with the inner mechanisms of the inboard side shaft joints 54.

A first and second pressure plate 78 is located adjacent to the friction plate 60 of the clutch pack housings 50. It should be known that the friction plates 60 are also collectively known or referred to as the clutch packs. The pressure plates 78 are capable of applying an axial load to the clutch packs. One side of the pressure plate 78 contacts the clutch pack 60 while on the opposite end of the pressure plate a ball ramp unit 80 engages the pressure plate surface. The ball ramp unit 80 generally has a ring like appearance and is located directly adjacent to the pressure plate 78 and is attached by any known securing means to an inside surface of the housing 40 or housing end plate 42. The ball ramp unit 80 generally includes a first 82 and second ramp 84 that has a plurality of balls 86 disbursed around the circumference between the first and second ramp 82, 84 surfaces. The first ramp 82 of the ball ramp unit 80 is connected to the housing 40 while the second ramp engages a gear set 88. The gear set 88 also engages with a motor 90. It should be noted that a first and second motor 90 is used to independently control the first and second clutch packs 50, respectively. The motors 90 are independently activated by an onboard system computer and will generate the necessary torque to activate the clutch packs 60 after being transmitted through the gear set 88 and then to the second ramp 84 of the ball ramp unit. When the motor 90 is activated this will transmit through the gear set 88 and ball ramp unit 80 an axial load to the pressure plate 78 which will engage the clutch packs 60 thus producing a transfer of input torque from the pinion shaft, through the clutch pack housing 50 through the friction plates 60 and onward to the inboard side shaft joints 54 and then finally on to the side shafts 26, 28 and then the wheels. With the capability of each motor 90 being separately regulated by a controller of the automotive vehicle the torque transmitted to each wheel is independently controlled regardless of what the other three wheels in the automotive vehicle are doing. In the preferred embodiment the motors 90 are attached to an outer surface of the axle module housing 40 in a manner such that they are side by side but perform an independent operation to control a separate side shaft for the axle module 10. It should be noted that in an alternative embodiment an oil pump may be required to ensure adequate lubrication of the components to prevent overheating depending on the duty cycle of the automotive vehicle. The pump is located on the shaft adjacent to the ring gear and thus allows lubricant through the hollow shaft and suitable channels to the clutch packs, bearings, ball ramps, and the inboard side shaft joints if the configuration used includes the stationary boot members 68.

Figure 5:
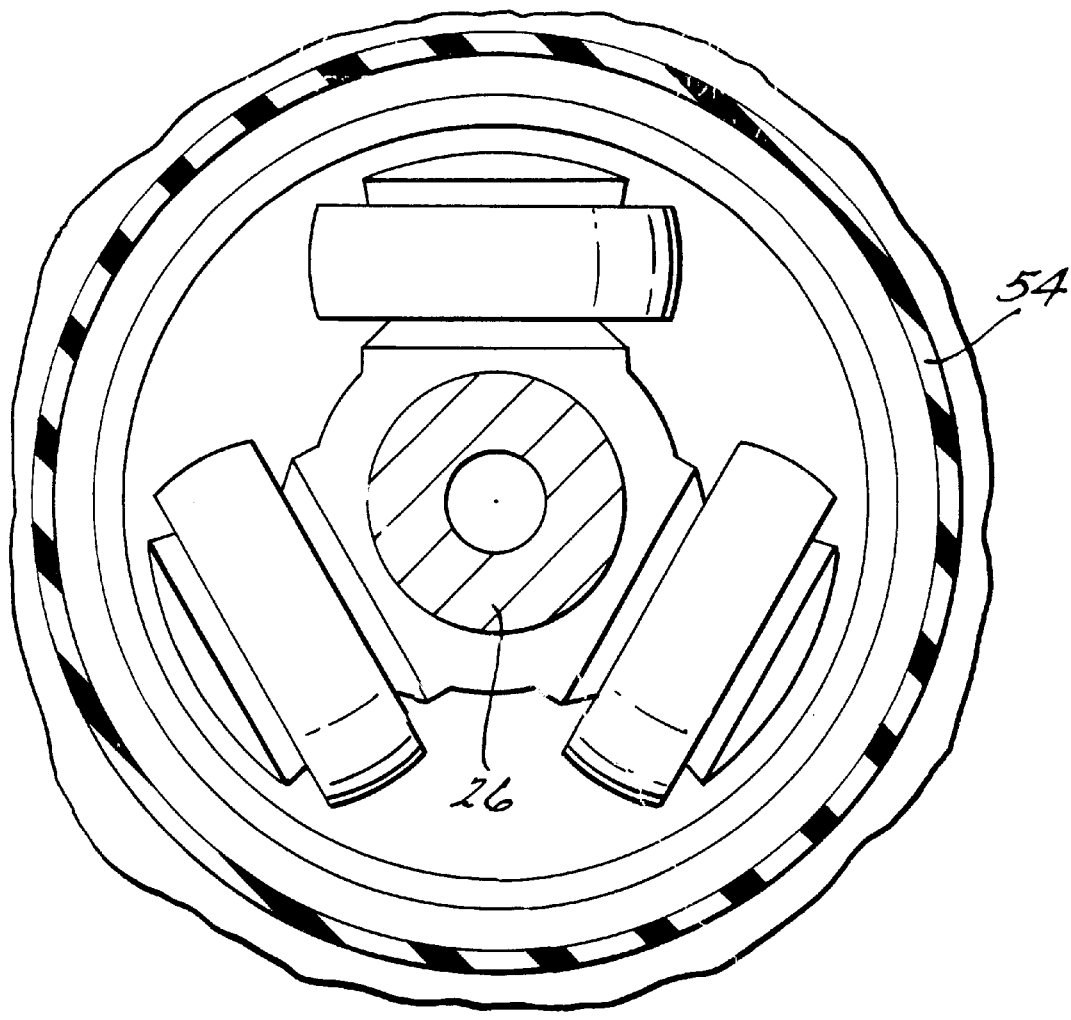
FIG. 5 shows a side view of a side shaft joint according to the present invention.

FIG. 5 shows a side view of the inboard side shaft joint 54 with the inner joint members used to connect to the side shafts. This type of joint in the preferred embodiment is a tripod joint but it should be noted any other type of joint may be used to connect the side shaft to the inboard side shaft joint unit. The tripod joint works as is well known in the art in the typical manner described in the prior art.

In operation the integrated axle module 10 with twin electronic torque management is controlled by an onboard computer control system. Generally speaking each side shaft 26, 28 and each wheel of an automobile vehicle will have a plurality of sensors monitoring numerous factors such as speed, if a vehicle wheel is slipping, if a vehicle wheel is braking, if the vehicle is in a turn, and a host of other identifiable factors that effect the handling and traction of an automotive vehicle. A specific example is that the onboard computer senses through its sensor network that a particular wheel in the secondary axle is in a spin condition it then will, via its controller, activate the individual motor 90 on the wheel opposite of the spinning wheel to engage thus sending more torque from the propeller shaft to the wheel that is in a non-slip condition, thus allowing the vehicle to recover from the slip condition. This occurs by having the motor 90 activate and rotate through the gear set 88, such that the second ramp 84 of the ball ramp unit 80 rotates a predetermined distance based on the gearing used in the gear set. This then causes the balls 86 to engage with the first ramp 82 and create an axial force by separating the ramps 82, 84. This axial force then transfers via the second ramp 84 to the pressure plate 78 which will engage the friction plate 60 within the clutch pack. When the friction plates 60 contact with one another and compress into one another, the clutch pack housing 50, which is spinning at the axle speed via the pinion gear and the ring gear, will begin transferring that input torque through the friction plates 60 to the inboard side shaft joint 54 thus creating more torque to the side shaft that has the electric motor 90 engaged and removing the vehicle from the slip condition in a quicker time period. Once the slip condition has been overcome and the vehicle wheels are running at equilibrium the motor 90 will be disengaged such that the ball ramp unit 80 is rotated such that the first and second ball ramps 82, 84 are at their narrowest width thus disengaging the friction plates 60 and allowing the torque to be evenly distributed between the side shafts 26, 28. The side shafts 26, 28 will have an equilibrium speed at which they will spin when the clutch packs 60 are not engaged. It should be noted that in operation the motors 90 can also act as an electronic cutoff unit by disconnecting the clutch pack 60 in an open position at all times, thus keeping the ball ramp at its narrowest position thus allowing no torque transfer between the clutch pack housing 50 and the inboard side shaft joints 54, therefore creating no torque to the wheels and allowing the wheel to roll along at hang-on speed. Hence, the motor 90 is also capable of allowing only a certain percentage of power to be sent to each wheel depending on the road conditions and what is being sensed by the onboard computer sensors. Therefore, at equilibrium conditions, the secondary axle side shafts spin at axle speed and the pinion gear will be spinning the ring gear 48 and hence the clutch pack housing at axle speed but there will be no torque or power transfer through the clutch packs until a condition occurs that requires more torque to be transferred from the primary driven axle to the secondary axle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An axle module, said module including:

a housing;

a shaft rotatably supported within said housing;

a ring gear connected to said shaft;

a clutch pack housing arranged within said housing and engaged with an end of said shaft;

a side shaft joint arranged within said clutch pack housing, plurality of plates contacting said clutch pack housing and a plurality of plates contacting said side shaft joint; and a side shaft connected to said side shaft joint.

2. The module of claim 1 further including an engagement mechanism, said engagement mechanism activates a clutch pack within said clutch pack housing.

3. The module of claim 2 wherein said engagement mechanism engages a ramp unit that provides an axial force.

4. The module of claim 3 wherein said ramp unit contacts a pressure plate on one side thereof and said clutch pack contacts said pressure plate on an opposite side thereof.

5. The module of claim 4 wherein said pressure plate transfers axial load from said ramp unit to said clutch packs by contacting said plates with one another.

6. The module of claim 5 wherein said engaged plates transfer input torque from said ring gear to said side shaft joints.

7. The module of claim 6 wherein torque transfer is controlled for each wheel of the axle module independently.

8. The module of claim 1 further including a rotating boot seal engaging said side shaft joint and said side shaft.

9. The module of claim 1 further including a stationary boot seal engaging said side shaft and said housing.

10. The module of claim 1 wherein said plurality of plates alternate in extending from said clutch pack housing and said side shaft joint.

11. An axle module for use in a vehicle having a plurality of wheels, said module including:
- a housing;
- a shaft rotatably supported within said housing;
- a ring gear connected to said shaft;
- a pinion gear engaged with said ring gear;
- a clutch pack housing arranged within said housing and connected to an end of said shaft;
- an inboard side shaft joint arranged within said clutch pack housing, said clutch pack housing and said inboard side shaft joint defines a chamber;
- a clutch pack arranged within said chamber, said clutch pack including a plurality of friction plates alternately connected to said clutch pack housing and said inboard side shaft joint; and
- a side shaft connected to said inboard side shaft joint.

12. The module of claim 11 further including a motor connected to said housing.

13. The module of claim 12 further including a ball ramp connected to said motor by a gear set, said ball ramp arranged adjacent to a pressure plate.

14. The module of claim 13 wherein said pressure plate is adjacent to said clutch pack.

15. The module of claim 14 wherein said ball ramp creates an axial force that acts on said pressure plate.

16. The module of claim 15 wherein said pressure plate compresses said friction plates and allows for input torque transfer from said ring gear to said inboard side shaft joint.

17. The module of claim 11 further including a second clutch pack housing and a second inboard side shaft joint connected to a second end of said shaft.

18. The module of claim 17 wherein a second motor controls a second clutch pack independently of said clutch pack, allowing for torque control to each wheel to be independent from every other wheel.

19. The module of claim 18 wherein a boot seal is stationary or rotates with respect to said housing.

20. An axle module for use in vehicle to control torque transmitted to each wheel independently, said axle module including:
- a housing;
- a shaft rotatably supported within said housing;
- a ring gear connected to said shaft;
- a pinion gear engaging said ring gear;
- a first and second clutch pack housing arranged on a first and second end of said shaft, respectively;
- a first and second inboard side shaft joint arranged within said first and second clutch pack housing, respectively, said clutch pack housings and said inboard side shaft joints define a chamber;
- a first and second plurality of friction plates extending into said chamber from an inside surface of said clutch pack housings and an outside surface of said inboard side shaft joints, said friction plates alternately attached to said clutch pack housings and said inboard side shaft joints respectively;
- a first and second pressure plate adjacent to said first and second clutch pack housing, respectively;
- a first and second ramp member adjacent to said pressure plates;
- a first and second motor controlling said first and second ramp, respectively, by a first and second gear set; and
- a first and second side shaft connected to an inner surface of said first and second inboard side shaft joints, respectively, each motor independently controlling torque to a wheel by use of said clutch packs.

* * * * *